United States Patent
Shaffer et al.

(10) Patent No.: US 6,738,343 B1
(45) Date of Patent: May 18, 2004

(54) SYSTEM AND METHOD FOR UTILIZING DIRECT USER SIGNALING TO ENHANCE FAULT TOLERANT H.323 SYSTEMS

(75) Inventors: Shmuel Shaffer, Palo Alto, CA (US); William J. Beyda, Cupertino, CA (US); Randall Wuerfel, Santa Clara, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/320,826

(22) Filed: May 26, 1999

(51) Int. Cl.$^7$ .................................................. H04J 1/16
(52) U.S. Cl. ...................... 370/216; 370/401; 379/88.17
(58) Field of Search ................. 370/225, 352, 370/353, 354, 355, 356, 400, 401, 216, 217, 218, 412, 228, 219, 220, 227, 328, 408, 338, 435; 455/5.1, 3.3, 427; 709/244, 245; 359/110; 379/57, 229, 230; 714/4

(56) References Cited

U.S. PATENT DOCUMENTS

| | | | |
|---|---|---|---|
| 5,084,816 A | * 1/1992 | Boese et al. ................... 714/4 |
| 5,384,840 A | * 1/1995 | Blatchford et al. .......... 379/230 |
| 5,517,563 A | 5/1996 | Norell |
| 5,592,466 A | * 1/1997 | Buczny et al. ............... 370/217 |
| 6,301,352 B1 | * 10/2001 | Chung et al. ................ 370/235 |
| 6,308,282 B1 | * 10/2001 | Huang et al. .................. 714/4 |
| 6,324,279 B1 | * 11/2001 | Kalmanek et al. .......... 370/389 |
| 6,349,100 B1 | * 2/2002 | Christie et al. .............. 370/400 |
| 6,366,557 B1 | * 4/2002 | Hunter ........................ 370/217 |
| 6,374,302 B1 | 4/2002 | Galasso et al. |
| 6,400,681 B1 | * 6/2002 | Bertin et al. ................. 370/218 |
| 6,430,176 B1 | * 8/2002 | Christie, IV ................. 370/355 |

| | | | |
|---|---|---|---|
| 2001/0001268 A1 | * 5/2001 | Menon et al. ............... 370/329 |
| 2001/0026548 A1 | * 10/2001 | Strathmeyer et al. ....... 370/356 |

OTHER PUBLICATIONS

U.S. patent application Ser. No. 09/296222, Korpi et al., filed Apr. 22, 1999, pending.
EP Search Report, Dec. 12, 2002.
Sengodan S: "A Gatekeeper Discovery Mechanism For H.323 Systems", Proceedings of the SPIE, SPIE, Bellingham, VA US, vol. 3528, 1999, pp. 319–326, XP000893007.
Toga J. et al: "ITU_T Standardization Activities for Interactive Multimedia Communications on Packet-Based Networks: H.323 and Related Recommendations", Computer Networks and ISDN Systems, North Holland Publishing, Amsterdam, NL, vol. 31, No. 3, Feb. 11, 1999. pp. 205–223.

* cited by examiner

*Primary Examiner*—Hassan Kizou
*Assistant Examiner*—John Pezzlo

(57) ABSTRACT

An H.323 client terminal (102) according to an embodiment of the invention employs primary and secondary H.323 control units or state machines (110a, 110b). The primary control unit (110a) sends signaling messages to a primary gatekeeper (108a) and triggers the secondary control unit (110b) to send a message with an appropriate correlation identifier directly to a second client terminal. The primary control unit (110a) establishes a call per standard H.323 protocols. The secondary control unit (110b) also establishes a direct signaling connection to the second client terminal as back up. However, no media channels are established for this backup signaling. The secondary control unit (110b) checks the status of the call with the primary control unit (110a). If the call signaling on the primary control unit (110a) is proceeding normally, no further action is taken. If the call signaling with the primary gatekeeper (108a) fails, the secondary control unit (110b) takes over the signaling communication via the direct signaling channel.

19 Claims, 7 Drawing Sheets

SYSTEM AND METHOD FOR UTILIZING DIRECT USER SIGNALING TO ENHANCE FAULT TOLERANT H.323 SYSTEMS

BACKGROUND OF THE INVENTION

1. Field of the Invention

The present invention relates to telecommunications systems and, particularly, to an improved fault tolerant H.323 system.

2. Description of the Related Art

The International Telecommunications Union (ITU) Recommendation H.323 describes a set of devices and protocols for multimedia communication over packet-switched networks. The four main components defined by the specification are clients (also referred to as terminals or endpoints), multipoint control units, gateways and gatekeepers.

The H.323 Recommendation provides for separate H.225.0 call signaling, H.245 call control signaling and media channels. Typically, H.225.0 call signaling and H.245 call control signaling are routed through a gatekeeper, while the media channels (i.e., audio, data and/or video) are routed directly between the endpoints. For example, to place a call between two clients, the calling party client sends a message to the gatekeeper, which resolves the address of the receiving party and sends the appropriate signaling messages to the caller and receiver. Once the signaling and control channels have been established, the endpoints establish the media channels. The media channel passes directly between the endpoints. The H.225.0 signaling channel and H.245 call control channel are also used to terminate the call.

If the gatekeeper fails for any reason, the endpoints become aware of this because their connection to the gatekeeper (usually seen in the client as a TCP socket) will close. When the H.245 call control channel is detected as having been closed, the H.323 Recommendation requires the endpoints to disconnect the call and close the media channel(s). This requirement exists so that when the gatekeeper does recover, there are no outstanding media connections still alive of which the gatekeeper is unaware. Thus, the network is prevented from perpetually maintaining a call. When bandwidth management is employed, the network is prevented from allowing more calls than the network can handle.

While redundant back-up gatekeepers which track other gatekeepers' operations have been known to be provided, such systems do not allow for preservation of ongoing calls. In these cases, ongoing calls are lost and the H.323 client terminals must re-register and re-initiate call setup again, which can cause a burst of excessive load on the network and on the gatekeeper. Moreover, gatekeeper to gatekeeper communication can consume processing power and load the system.

The H.323 Recommendation provides for direct signaling between endpoints. If an endpoint knows the transport address of a destination endpoint, then the H.225.0 call signaling and H.245 call control channels can be established directly between the endpoints. However, direct signaling does not permit the full range of features users generally expect today from telephony systems, such as call transfer or forwarding, or bandwidth control.

SUMMARY OF THE INVENTION

These disadvantages in the prior art are overcome in large part by a system and method according to the present invention. In particular, H.323 client terminals according to the present invention include redundancy supervisory layers which provide redundant H.225.0 call signaling and H.245 call control in direct signaling mode, while the primary connection uses gatekeeper routed signaling.

Once the primary gatekeeper-routed connection is established and it has been determined during capability exchange that redundancy supervisory layers are present, then the redundancy supervisory layers set up call signaling and call control channels directly between the communicating endpoints. However, the redundancy supervisory layers recognize the existence of the primary connection and therefore do not establish a media or payload channel(s) for the redundant direct signaling. If the gatekeeper fails, the media channel(s) is maintained, and the redundancy supervisory layers know that signaling is to be handled through the direct signaling and call control channels. The client terminal's user interface may "black out" (prohibit the invocation of) features which are not available when in direct signaling mode.

In addition, according to one embodiment of the invention, the redundancy supervisory layers are configured, when in active mode, to seek a backup gatekeeper and attempt to re-establish primary signaling via the backup gatekeeper. Once the call signaling and call control channels are established via the new primary gatekeeper, the direct signaling mode becomes secondary again and any features which had been disabled during the transition phase will be enabled again.

An H.323 client terminal according to an embodiment of the invention employs primary and secondary H.323 control units or state machines. The primary control unit sends signaling messages to a gatekeeper and triggers the secondary control unit to send a message with the appropriate identifier directly to the other endpoint's redundancy supervisory layer. The primary control unit continues to establish the call per standard H.323 protocols. As the secondary control unit receives signaling directly from the other terminal, the secondary control unit checks the status of the call with the primary control unit. If the call signaling on the primary control unit is proceeding normally, no further action is taken. If the call signaling with the primary gatekeeper fails, the secondary control unit takes over communication. When the secondary control unit has taken over communication, according to one embodiment of the invention, the secondary control unit tries to re-establish a new primary, gatekeeper-routed call signaling and control channels.

A better understanding of the invention is obtained when the following detailed description is considered in conjunction with the following drawings.

DETAILED DESCRIPTION OF THE INVENTION

Figure 1:
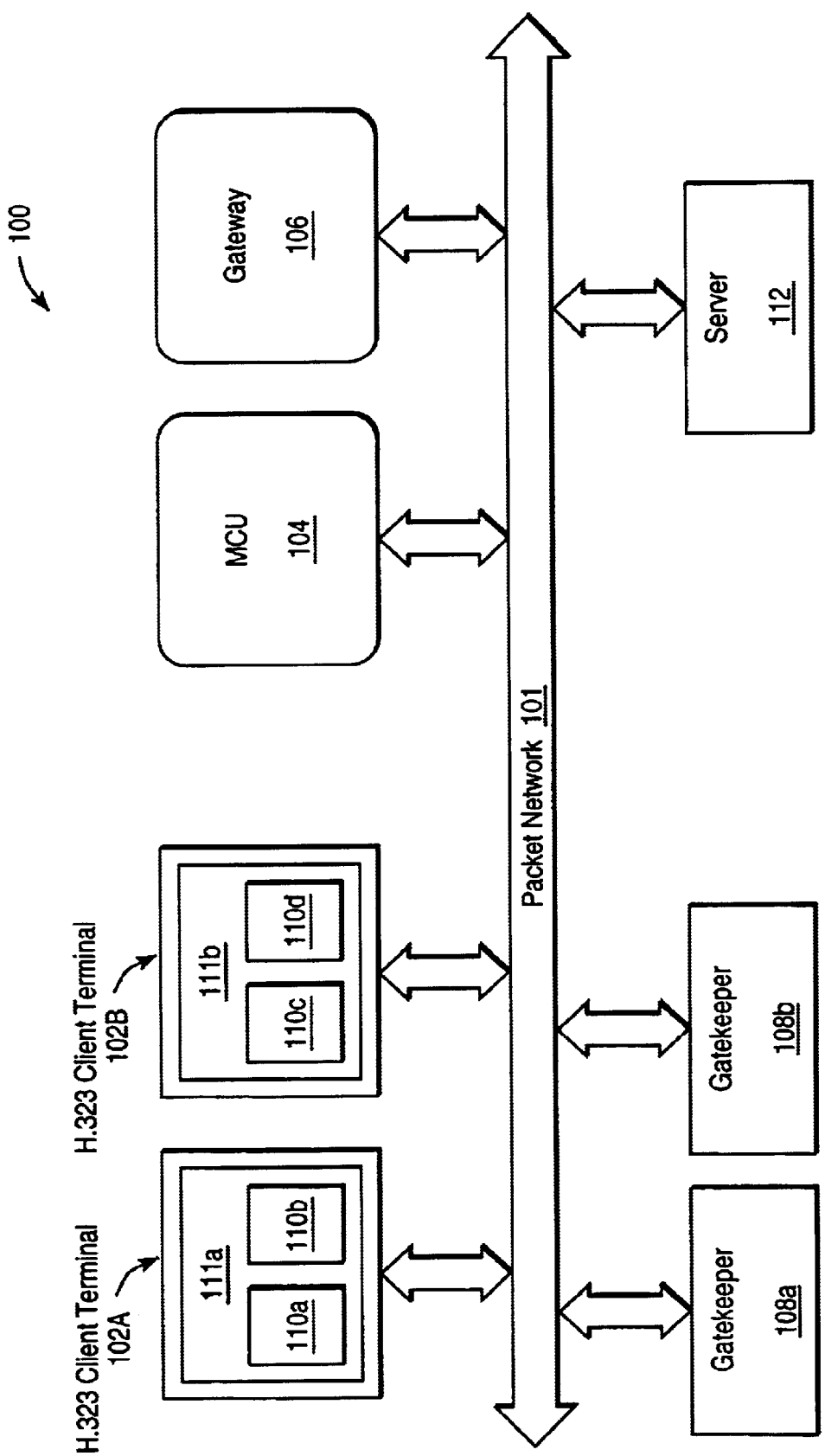
FIG. 1 is a diagram illustrating an H.323 system according to an embodiment of the invention.

Turning now to the, drawings, and with particular attention to FIG. 1, a diagram illustrating an exemplary H.323 telecommunications system 100 according to an embodiment of the present invention is shown. It is noted that, while described herein with regard to an H.323 network, the invention is equally applicable to any network in which separate media and signaling channels are used, such as MGCP (Media Gateway Control Protocol), SIP+ (Inter MGS Protocol), SGCP, MEGACO and generally, any voice or multimedia over IP scheme. Further, it is noted that, while described specifically in the context of voice packets, the present invention encompasses the use of any multimedia information, such as video, data, voice, or any combinations thereof.

The telecommunications system 100 includes a local area network (LAN) or packet network 101. Coupled to the LAN 101 may be a variety of H.323 terminals 102a, 102b, a multi-point control unit (MCU) 104, an H.323 gateway 106, a primary H.323 gatekeeper 108a, a backup H.323 gatekeeper 108b, a LAN server 112 and a plurality of other devices such as personal computers (not shown). The H.323 terminals 102a, 102b are in compliance with the H.323 Recommendation. Thus, the H.323 terminals 102a, 102b support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 terminals 102a, 102b may further implement audio and video codecs, T.120 data conferencing protocols and MCU capabilities. Further details concerning the H.323 Recommendation may be obtained from the International Telecommunications Union; the H.323 Recommendation is hereby incorporated by reference in its entirety as if fully set forth herein.

Further, the H.323 terminals 102a, 102b include redundancy control units (also referred to as "redundancy supervisory layers") 111a, 111b, each of which includes a primary and secondary control unit 110a, 110b and 110c, 110d, respectively (typically embodied as coupled state machines), according to the present invention. The redundancy control units 111a, 111b function to provide H.323 signaling via the primary gatekeeper 108a and directly to one another, as well. In addition, according to one embodiment of this invention, the redundancy control units 111a, 111b attempt to establish a new primary gatekeeper-routed connection via a back-up gatekeeper 108b, if the primary gatekeeper 108a goes down. The redundancy control units 111a, 111b function to provide a system with two signaling channels (and two control channels) but a single media or payload channel (s) allocated only for the primary connection, as will be discussed in greater detail below. It is noted that, while illustrated with a single backup gatekeeper 108b, either no back ups or more than one back up may be provided. Thus, FIG. 1 is exemplary only.

Figure 2A:
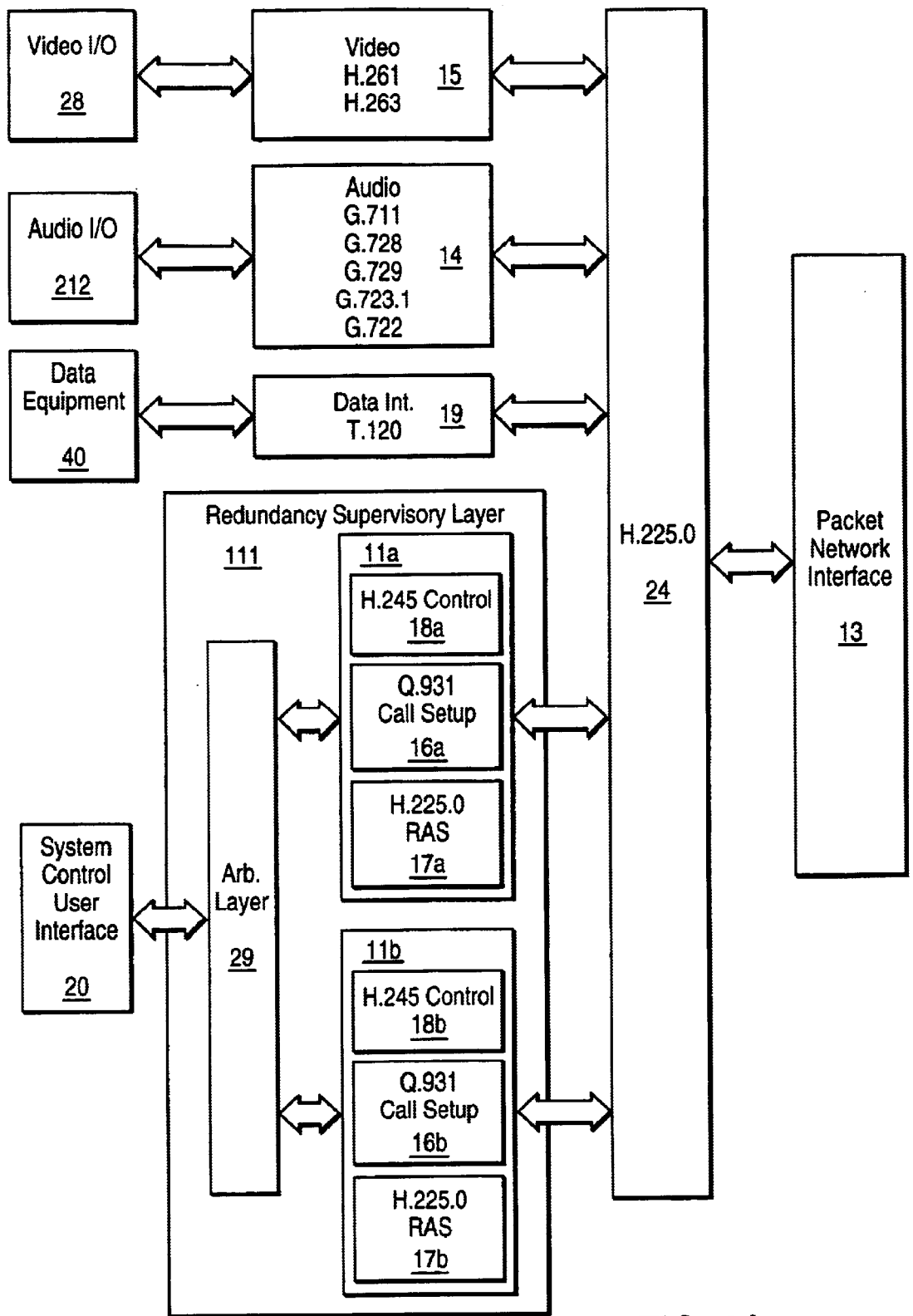
FIGS. 2A–2C illustrate an H.323 terminal with a redundancy supervisory layer according to an embodiment of the invention.

In accordance with a specific embodiment, FIG. 2A illustrates a logical diagram of an H.323 interface to the LAN 101. It is noted that, while illustrated in network layer format, typically, the redundancy supervisory layer 111 is implemented as one or more coupled state machines capable of implementing the H.323 protocol. The interface includes a network terminal/device 102 including a redundancy supervisory layer 111 according to the present invention and a packet network interface 13 that is coupled to the network terminal 102. As will be discussed in greater detail below, the network terminal 102 utilizes the ITU-T H.323 Recommendation protocol. The network interface 13 couples the network terminal 102 to the LAN 101. H.323 terminals/devices and equipment carry real-time voice, video and/or data. It should be noted that H.323 is an umbrella recommendation that provides recommendations for multimedia communications, including telephony-over-LAN communications. The network can include packet-switched Transmission Control Protocol/Internet Protocol (TCP/IP) and Internet Packet Exchange (IPX) over Ethernet, Fast Ethernet and Token Ring networks.

The H.323 terminal 102 is coupled to a video input/output (I/O) interface 28, an audio I/O interface 212, a data equipment interface 40, and a system control user interface (SCUI) 20. The network terminal 102 further includes an H.225.0 layer 24, an audio coder/decoder (codec) 14 and may include, a video codec 15, and a T.120 data interface layer 19. The audio I/O interface or card 212, which may be part of the standard H.323 device, connects to the audio codec 14, such as a G.711 codec, for encoding and decoding audio signals. The audio codec 14 coupled to the H.225.0 layer 24 encodes audio signals for transmission and decodes the received signals. Although the G.711 codec is the mandatory audio codec for an H.323 terminal, other audio codecs, such as G.728, G.729, G.723.1, G.722, and MPEG1 audio may also be used for encoding and decoding speech. G.723.1 is a preferred codec because of its reasonably low bit rate, which enables preservation of link bandwidth, particularly in slower speed network connections.

The video I/O interface or card 28, which may be part of the standard H.323 device, connects to a video codec 15, such as an H.261 codec for encoding and decoding video signals. The video codec 15 encodes video signals for transmission and decodes the received signals. H.261 is the mandatory codec for H.323 terminals that support video, though other codecs such as H.263 may be supported.

The system control user interface (SCUI) 20 provides signaling and flow control for proper operation of the H.323 terminal 102. In particular, call signaling and control are handled by the SCUI 20. A redundancy supervisory layer 111 according to the present invention is coupled to the SCUI 20. The redundancy supervisory layer 111 according to the present invention includes a pair of control layers 11a, 11b, and an arbitration layer 29. The primary control layer 11a is configured to operate in a gatekeeper-routed mode, while the secondary gatekeeper is configured to operate in a direct (non-gatekeeper-routed) mode. The control layers 11a, 11b are standard H.323 control layers and thus include Q.931 layers 16a, 16b, H.225.0 RAS layers 17a, 17b, and H.245 layers 18a, 18b. Thus, the SCUI 20 interfaces via the arbitration layer 29 to the H.245 layer 18 which is the media control protocol that allows capability exchange, opening and closing of logical channels, mode preference requests, flow control messages, and other miscellaneous commands and indications. The SCUI 20 also interfaces via the arbitration layer 29 to the Q.931 protocol which defines the setup, teardown, and control of H.323 communication sessions. The SCUI 20 further interfaces via the arbitration layer 29 to the H.225.0 Registration, Admission and Status (RAS) protocol that defines how H.323 entities can access H.323 gatekeepers to perform, among other things, address translation, thereby allowing H.323 endpoints to locate other H.323 endpoints via an H.323 gatekeeper. The H.225.0 layer 24, which is derived from the Q.931 layer 16a, 16b, is the protocol for establishing a connection among two or more terminals and also formats the transmitted video, audio, data, signaling, and control streams into messages for communication via the network interface 13 (e.g., packet network 101). The H.225.0 layer 24 also retrieves the received video, audio, data, signaling and control streams from messages that have been input from the network interface, routes the signaling and control information to the appropriate control layer 11a, 11b and routes media streams to the appropriate audio, video and data interfaces.

Thus, an H.323 network may be configured to include several different devices. For example, the network may include a terminal for enabling a user connected to a LAN to communicate with another user on the LAN, a terminal for enabling a caller resident on the LAN to call a second party in the public switched network and/or a terminal for enabling an adapter to communicate through a wireless trunk, using a wireless telephone. The device may also implement supplementary services according to the H.450.X Recommendations.

The arbitration layer 29 according to the present invention provides a single signaling flow to the SCUI 20. If both control layers 11a, 11b are functioning, the arbitration layer 29 selects the primary control state machine or control layer. If the control layer 11a is down, because the gatekeeper is down, the arbitration layer 29 selects the operational secondary state machine 11b, which operates in a direct (non gatekeeper-routed) mode. This is illustrated schematically in FIGS. 2B and 2C.

Figure 2B:
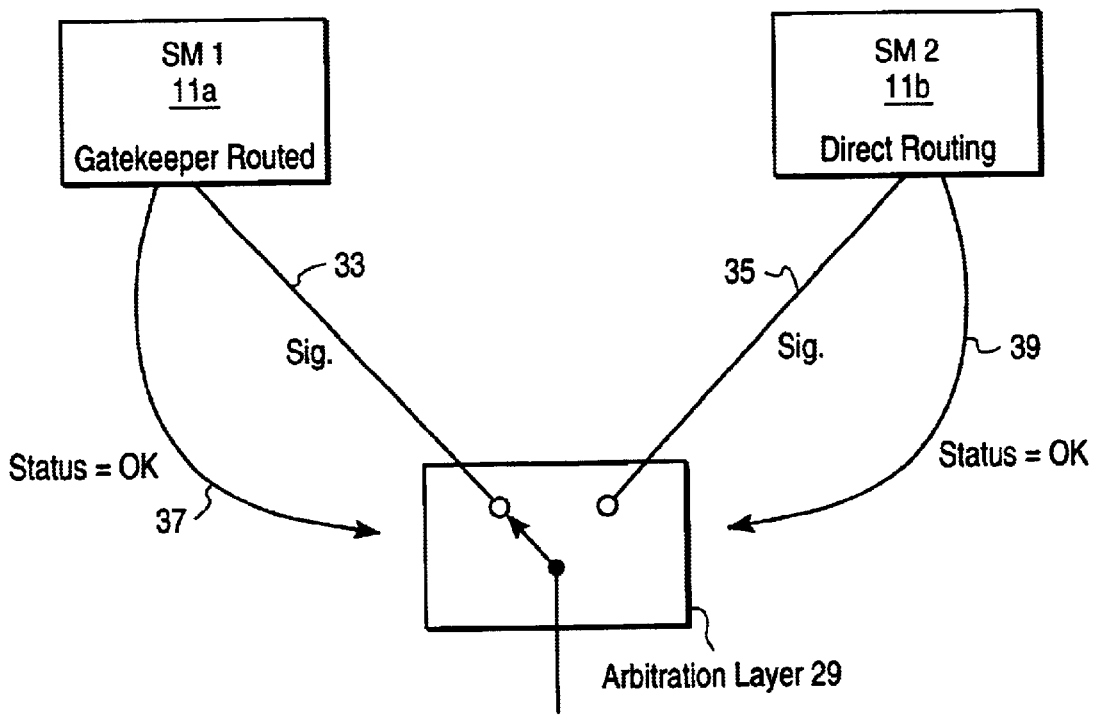
Figure 2C:
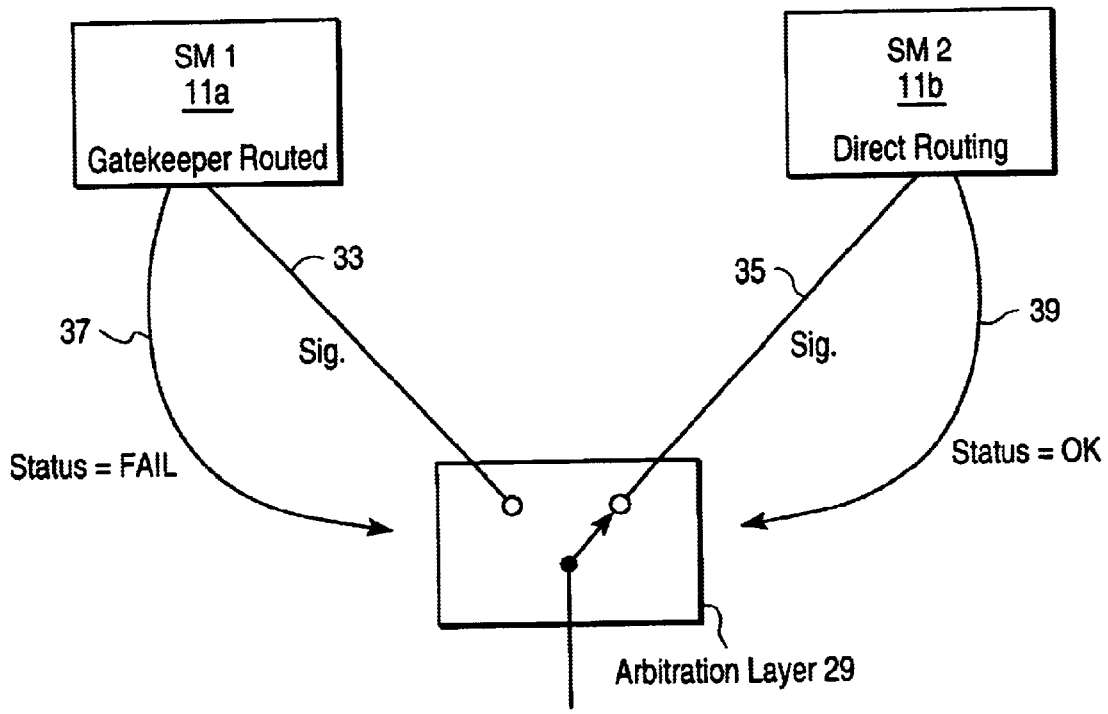

The arbitration layer 29 of FIG. 2B receives H.225.0 call and H.245 control signaling along lines 33, 35 from the primary and secondary state machines SM1, SM2. The arbitration layer 29 further receives status signals along lines 37, 39 from the state machines SM1, SM2, indicative of whether they (and hence the gatekeeper or other endpoint(s) from which they are receiving signaling) are up and functioning. Assuming both state machines are active, the arbitration layer 29 selects to receive and transmit to the SCUI 20 the H.225.0 and H.245 signaling from the primary gatekeeper-routed state machine SM1. FIG. 2C illustrates the situation in which the primary state machine SM1 has failed because the gatekeeper from which it had been receiving signaling had failed. In this case, the arbitration layer 29 reads the status signal along line 37 and switches to receive H.323, H.225.0 and H.245 signaling from the (direct mode) state machine SM2, from which an active status signal had been received, along line 39.

Furthermore, the terminal 102 shown in FIG. 2A is capable of functioning in an environment in which only a few of the terminals are similarly equipped. That is, not all of the H.323 client endpoints need be equipped with redundancy supervisory layers 111. The availability of the redundancy supervisory layer 111 is determined during call set up. It is utilized only if both clients are so equipped. If only one client is so equipped, the system defaults to a normal, non-redundant operation, using state machine SM1. Thus, the present invention advantageously permits redundancy and fault tolerance to be assigned among only selected clients or groups of clients within a system.

Figure 3:
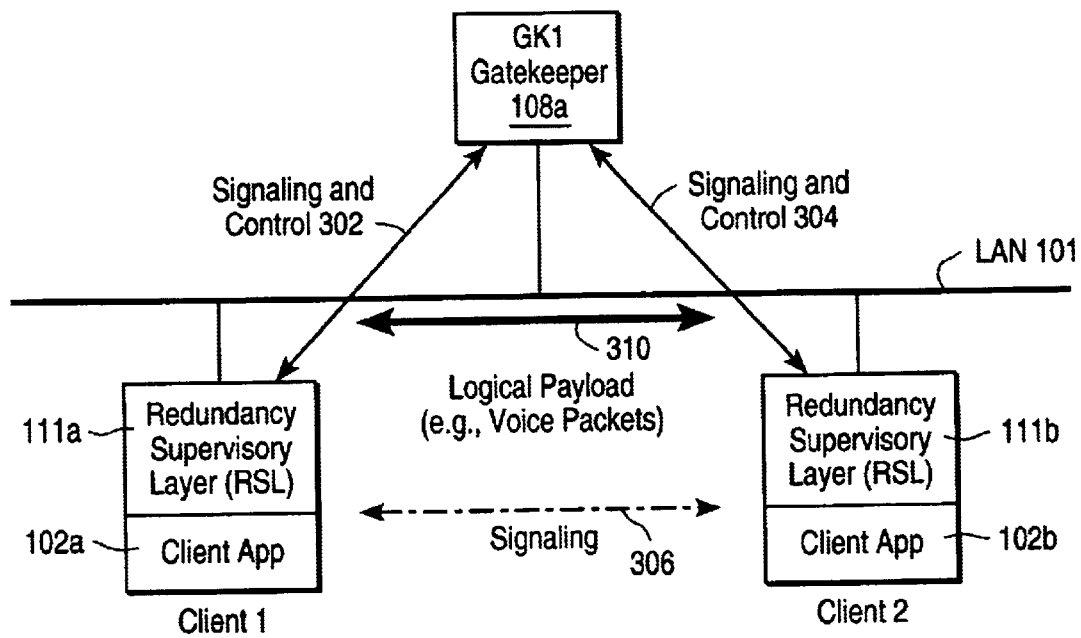
FIG. 3 is a diagram illustrating signaling flow according to an embodiment of the invention.

FIG. 3 illustrates the signaling for operation of an embodiment of the invention. It is noted that while the signal paths are shown as direct connections, typically, signaling is conducted via the LAN 101. As shown, a gatekeeper GK 1 and a pair of client terminals or endpoints Client 1 and Client 2 are connected to the LAN 101. The endpoints Client 1 and Client 2 include redundancy supervisory layers 111a, 111b, according to the present invention, as well as client applications 102a, 102b.

If Client 1 initiates a call to Client 2, it sends an H.225.0 setup message, including a globally unique call identifier (GUId), to its primary gatekeeper GK 1 along signaling path 302. This causes the gatekeeper GK 1 to send an H.225.0 Setup message to the endpoint Client 2 along signaling path 304. Client 2 responds along the path 304 and the call is set up in the standard fashion. The media channel 310 for the call payload is then established directly between the endpoints. The H.323 call setup also includes a capability exchange to allow the endpoints to determine that a redundancy supervisory layer is available at both ends. Then, the endpoint Client 1 sends a direct, non-gatekeeper routed, H.225.0 Setup message to the endpoint Client 2 via signaling path 306. This H.225.0 Setup message contains the same GUId as was used to set up the call via the gatekeeper GK 1. It is noted, however, that the GUId need not be identical, so long as it is related to the original GUId in a known manner. The endpoint Client 2 recognizes the GUId as identifying a backup connection and accepts it. However, the endpoint Clients 1 and 2 will undertake no further call setup action in response to this second H.225.0 Setup message (i.e., a separate media payload channel will not be established.). Due to the existence of the redundancy supervisory layers and their associated arbitration layers 29, the Client applications are aware only that they are receiving a single signaling channel and a stream of media packets. The Client applications are not aware of the existence of the redundant, direct signaling channel.

If the gatekeeper GK 1 stays up during the entire call, when one of the users disconnects, the user's endpoint client sends standard clearing messages to gatekeeper GK 1 and to the other endpoint directly. The gatekeeper GK 1 terminates the call by sending clearing messages to the other endpoint client and closing the call signaling and call control channels. The directly routed call signaling and control channels are also cleared. The redundancy supervisory layer 111a, 111b in each endpoint client performs the termination function (and clearing of any related features) based on the primary clearing message. The client application need not be informed of the clearing of the secondary control signals. The arbitration layer 29 passes the clearing information from the primary state machine or control layer to the Client application via the SCUI 20. The arbitration layer 29 ensures that the secondary state machine closes its signaling and control channels properly, as well.

If the gatekeeper GK 1 fails during the call, its signaling channel (along paths 302, 304) between the endpoints Client 1 and Client 2 is cleared. The failure of the gatekeeper GK 1 is recognized at the endpoints, for example, as a TCP socket closing. According to the present invention, the media or payload channel 310 is maintained and the secondary direct (non-gatekeeper routed) signaling channel 2 (along path 306) is used.

Figure 4A:
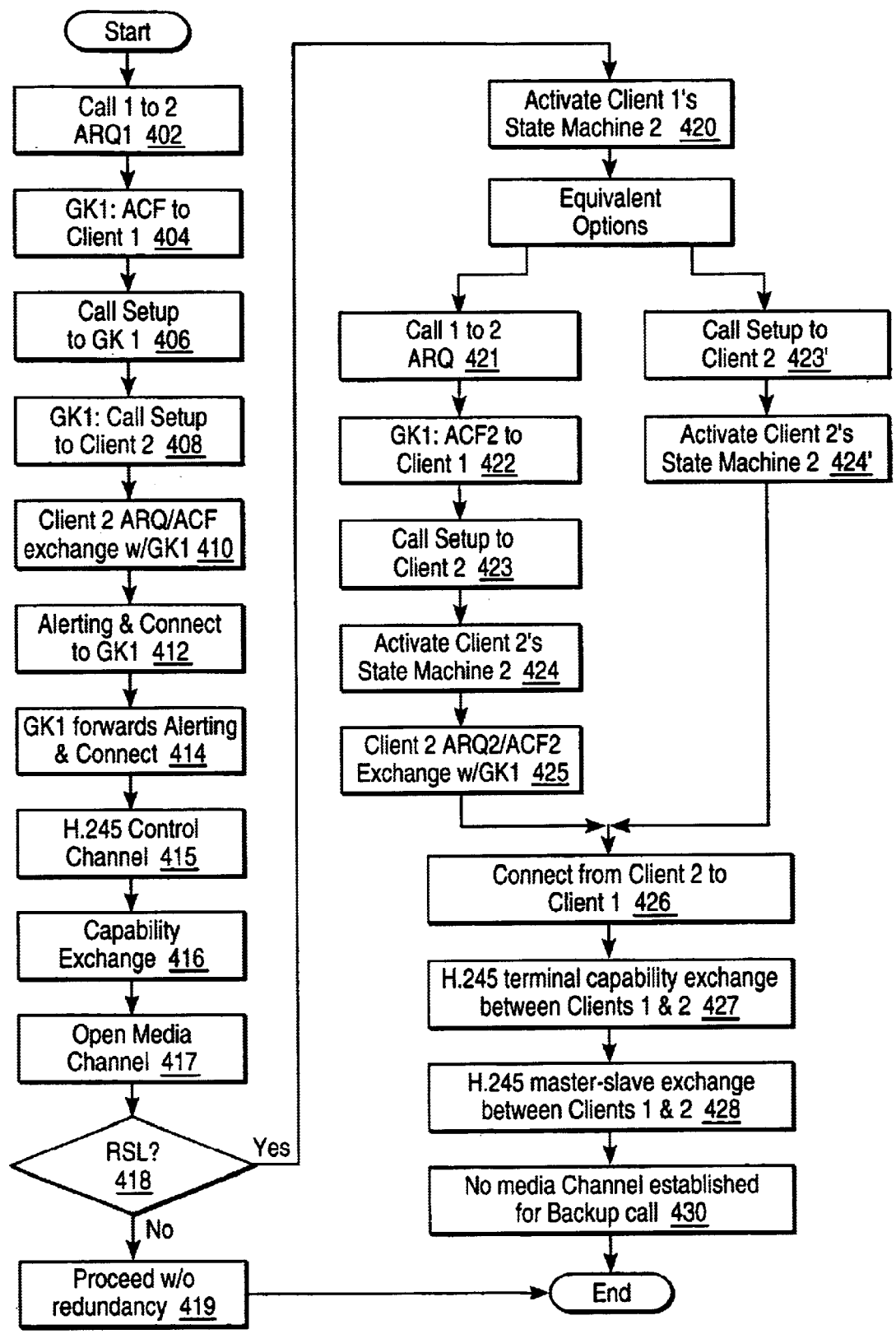
FIGS. 4A–4C are flowcharts illustrating system operation according to an embodiment of the invention.
Figure 4B:
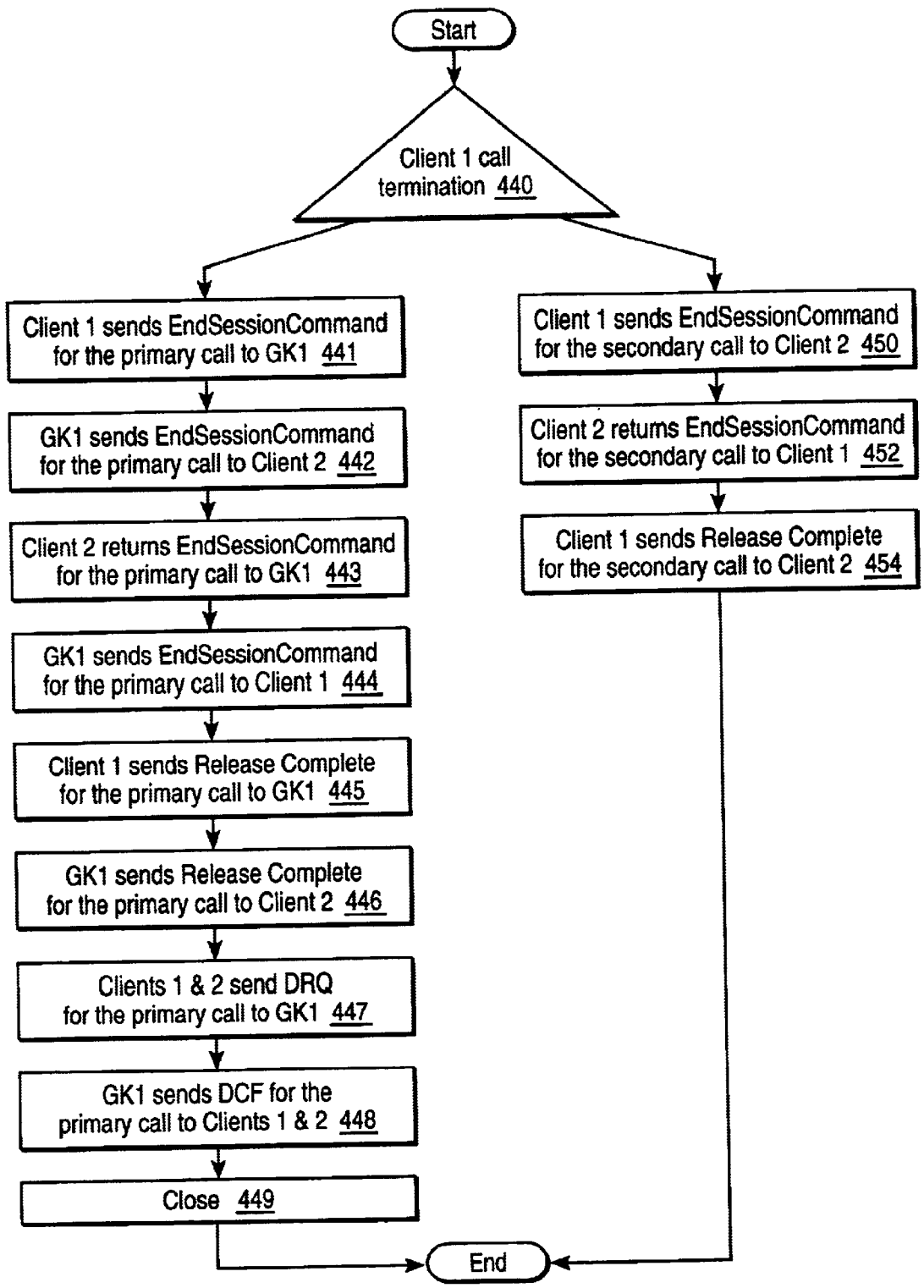
Figure 4C:
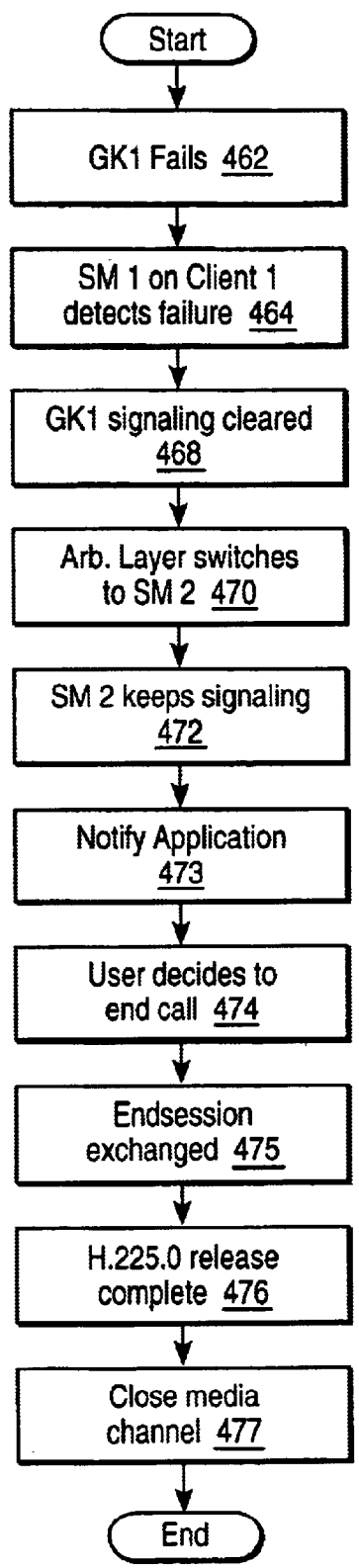

Operation of this embodiment of the invention is illustrated more clearly with reference to the flowcharts of FIGS. 4A–4C. In particular, with reference to FIG. 4A, in a step 402, the endpoint Client 1 wants to establish a call to another endpoint, Client 2. The endpoint Client 1 and, particularly, the primary state machine or primary control unit 110a, sends an ARQ message (AdmissionRequest) to the gatekeeper GK 1. Assuming the gatekeeper GK 1 is functioning, the gatekeeper GK 1 responds with an ACF (AdmissionConfirm) message to Client 1, in a step 404, which is received by the primary state machine 110a. The ACF message includes a Call Signaling Transport Channel Address of the gatekeeper GK 1. In a step 406, in response to the ACF message, the primary state machine 110a sends an H.225.0 set-up message to the gatekeeper GK 1, including a Globally Unique Call Identifier to identify the call.

In a step 408, the gatekeeper GK 1 relays the H.225.0 set-up message to the endpoint Client 2 and, in particular, its primary state machine or primary control unit 110c. In response, in a step 410, the endpoint Client 2's primary state machine 110c conducts an ARQ/ACF exchange with the gatekeeper GK 1. In a step 412, the endpoint Client 2's primary state machine 110c sends H.225.0 Alerting and Connect messages to the gatekeeper GK 1 as the call progresses to the connect state. The gatekeeper GK 1, in turn provides the Alerting and Connect messages to the endpoint Client 1's primary state machine 110a in a step 414. The Alerting or Connect message includes the Gatekeeper H.245 Control Channel Transport Address, which is used, in a step 415, to establish the H.245 control channel. Next, an H.245 capability exchange is undertaken, in a step 416. In a step 417 the media channel is opened between endpoint Client 1 and Client 2. The capability exchange includes exchanges of the coding algorithm to be used, and the like. In addition, according to the present invention, the capability exchange includes an exchange of whether or not each side is equipped with a redundancy supervisory layer 111, a determination which is made in a step 418. If one side is not equipped with a redundancy supervisory layer 111, then in a step 419, the system proceeds with normal gatekeeper-routed call setup without redundancy, and the non-equipped side uses its only state machine as the "primary" state machine. In step 418 if it is determined that both sides are equipped with a redundancy supervisory layer, then the primary state machine 110a sends a signal activating the secondary state machine 110b in a step 420.

In a step 421, the secondary control unit 110b sends an ARQ message to the gatekeeper GK 1 requesting that a call to endpoint Client 2 be allowed using a direct call model. In a step 422, the gatekeeper GK 1 responds with an ACF message to the endpoint Client 1, which is received by the secondary state machine 110b. The ACF message includes a Call Signaling Transport Channel Address of the endpoint Client 2. In a step 423, in response to the ACF message, the secondary state machine 110b sends an H.225.0 Setup message directly to endpoint Client 2, including the Globally Unique Call Identifier of the primary call (which was established in steps 402 through 417). In a step 424, the endpoint Client 2 receives the H.225.0 setup message and determines that it is related to an existing call (the call established in steps 402 through 417). This causes endpoint Client 2's primary state machine 110c to send a signal activating the secondary state machine 110d to process the received H.225.0 setup message. In response to the setup message, in a step 425, the endpoint Client 2's secondary state machine 110d conducts an ARQ/ACF exchange with the gatekeeper GK 1. Next, in a step 426, the endpoint Client 2's secondary state machine 110d sends an H.225.0 Connect message to the endpoint Client 1's secondary state machine 110b to progress the secondary call to a connect state. In a step 427, the endpoint Clients 1 and 2 exchange H.245 terminal capability messages.

In a step 428, the endpoints Client 1 and Client 2 exchange H.245 masterslave determination messages and any other needed H.245 messages. In a step 430, however, both endpoints Client 1 and Client 2 and, particularly, their redundancy supervisory layers 111b and 111d, recognize that the signaling is redundant from the GUId's initially provided in the call set up and do not establish a media channel. It is noted that the establishment of the secondary direct signaling could be accomplished at any time after the initial GUId is determined and after the address of Client 2 is obtained via the primary connection or via the ARQ/ACF exchange. Thus, FIG. 4A is exemplary only.

In another embodiment, the exchange of ARQ/ACF messages may be omitted after step 420. That is, a direct call may be established between secondary control units 110b and 110d with no involvement of gatekeeper GK 1. In this scenario, steps 421, 422 and 425 are omitted.

That is, after step 420, in a step 423', the secondary state machine 110b sends an H.225.0 message directly to endpoint Client 2, including the Globally Unique Call Identifier of the primary call (which was established in steps 402 through 417). In a step 424', the endpoint Client 2 receives the H.225.0 Setup message and determines that it is related to an existing call (the call established in steps 402 through 417). This causes endpoint Client 2's primary state machine 110c to send a signal activating the secondary state machine 110d to process the received H.225.0 Setup message. Next, steps 426, 427, 428 and 430 as described above are followed.

Turning now to FIG. 4B, a flowchart illustrating the termination process is shown for a call with redundant signaling. In a step 440, call termination is initiated by the user of endpoint Client 1. It is noted that the call termination could be initiated from the endpoint Client 2 as well. In a step 441, the endpoint Client 1 (and, in particular, the state machine 110a), for example, initiates call termination by sending an H.245 endSessionCommand to gatekeeper GK 1. The gatekeeper GK 1, in a step 442, sends the H.245 endSessionCommand on to endpoint Client 2. In a step 443, endpoint Client 2 (and, in particular, the state machine 110c) responds to the received H.245 endSessionCommand by sending its own H.245 endSessionCommand to the gatekeeper GK 1. The gatekeeper GK 1, in a step 444, sends the H.245 endSessionCommand on to endpoint Client 1. In a step 445, endpoint Client 1 sends an H.225.0 Release Complete message to gatekeeper GK 1 to close the call signaling channel. The gatekeeper GK 1, in a step 446, sends the Release Complete message on to endpoint Client 2. The endpoint Clients 1 and 2 then inform gatekeeper GK 1 to release the bandwidth for the primary call by sending Disengage Request (DRQ) messages to GK 1, in a step 447. In a step 448, gatekeeper GK 1 responds to the received DRQ messages by sending endpoint Clients 1 and 2 Disengage Confirm (DCF) messages. In a step 449, the media connection is closed, as well as the signaling connections being handled by the primary state machines 110a, 110c.

In parallel, the endpoint Client 1 (and, in particular, the state machine 110b) also sends an endSession command to the endpoint Client 2's secondary state machine 110d in a step 450. In a step 452, the endpoint Client 2's secondary state machine 110d sends a corresponding endSession command to the endpoint Client 1's secondary state machine 110b. Finally, in a step 454 the endpoint Client 1's secondary state machine 110b sends a Release Complete message to the endpoint Client 2's secondary state machine 110d and clears the signaling channels, but undertakes no action with respect to the media channel.

Turning now to FIG. 4C, a diagram illustrating operation of the system when gatekeeper GK 1 failure is determined. In particular, in a step 462, the gatekeeper GK 1 fails. Next, in a step 464, the primary state machine 110a of the endpoint Client 1 detects the failure of the gatekeeper GK 1, typically as a closed TCP socket. In response, in step 468, the endpoint Client 1's primary state machine 110a clears its gatekeeper GK 1 signaling. However, the secondary state machine 110b maintains its direct signaling to the secondary state machine 110d of endpoint Client 2. In a step 470, the arbitration layer 29 detects that the primary state machine 110a is down and thus it continues the session by using the secondary state machine 110b. In a step 472, the secondary state machine 110b maintains its signaling directly with Client 2's secondary state machine 110d. In a step 473, the arbitration layer 29 notifies the client application that the primary state machine SM 1 (110a) is down. In response, the application may "black out" (prohibit the invocation on in a known manner features that are not available in a direct mode call. It is noted that a similar series of steps occurs at the endpoint Client 2. The endpoints are thus able to terminate the call or continue it without waiting for a new gatekeeper. In a step 474, when the user of endpoint Client 1 decides to terminate the call, for example, the state machine 110b of the endpoint Client 1 sends an endSession command to the endpoint Client 2, in a step 475. The endpoint Client 2's secondary state machine 110d returns a similar command. A similar sequence of messages may be initiated from state machine 110d of Client 2 if the user of endpoint Client 2 had decided to terminate the call. In a step 476, the state machine 110b sends an H.225.0 Release Complete message to the endpoint Client 2. Finally, in a step 477, the media channel is closed.

Figure 5:
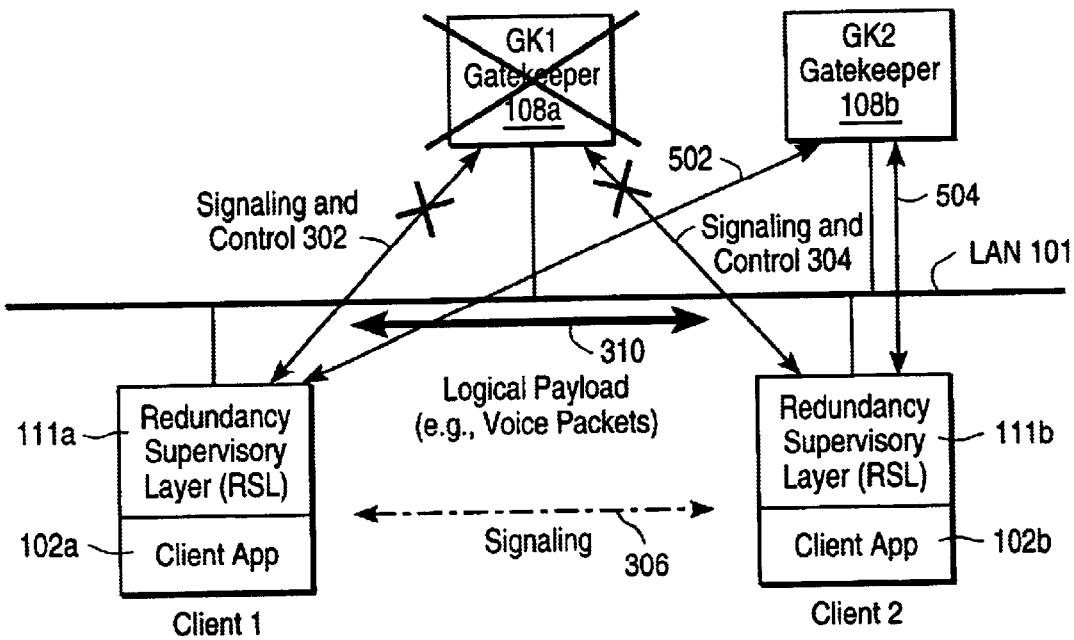
FIG. 5 is a diagram illustrating signaling flow according to another embodiment of the invention.

A further enhancement of the present invention is shown in FIG. 5. In particular, FIG. 5 is similar to FIG. 3, but includes an additional gatekeeper GK 2, which functions as a back up, as will be explained in greater detail below. As shown, the gatekeeper GK 1 has failed, leaving the media channel 310 intact, and with the redundant or secondary direct signaling and control channel 306 having taken over.

As discussed above, in response to detecting the failure of the primary gatekeeper and continuation of the communication with the backup direct signaling, the redundancy supervisory layer 111a will attempt to search for another gatekeeper, to take over the signaling from the secondary, direct signaling connection. The state machine 110a does so in the standard fashion. Once a gatekeeper (specifically, backup gatekeeper GK 2) is detected, the state machine 110a sends an H.225.0 Setup message to the gatekeeper GK 2 via signaling path 502. This call set up includes the GUId that was originally established during call set up with the gatekeeper GK 1. The H.225.0 Setup message is sent by the gatekeeper GK 2 to the endpoint Client 2 via the signaling path 504. The state machine 110c of the endpoint Client 2 recognizes the GUId and then begins the Admission Request/Acknowledge exchange. The call set up proceeds in the standard fashion, but rather than establishing a new media channel, the already existing one is transferred to the control of the gatekeeper GK 2 routed signaling. Then, the direct signaling between state machines 110b, 110d is once again used as a back up.

Figure 6:
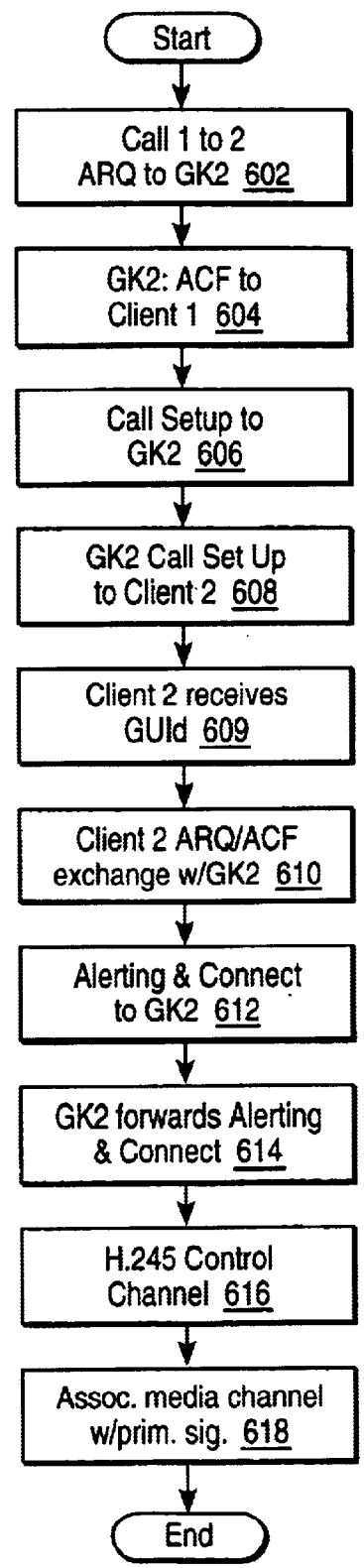
FIG. 6 is a flowchart illustrating system operation according to the embodiment of FIG. 5.

Operation of this embodiment of the invention is illustrated more clearly with reference to the flowchart of FIG. 6. In particular, in a step 602, the endpoint Client 1 wants to set up a new primary gatekeeper routed signaling channel with the endpoint Client 2. The endpoint Client 1 and, particularly, the primary state machine 110a, sends an ARQ message (AdmissionRequest) to the gatekeeper GK 2. Assuming the gatekeeper GK 2 is functioning, the gatekeeper GK 2 responds with an ACF (AdmissionConfirm) message to the endpoint Client 1's primary state machine 110a, in a step 604. The ACF message includes a Call Signaling Transport Channel Address of the gatekeeper GK 2. In a step 606, in response to the ACF message, the primary state machine 110a sends an H.225.0 Setup message to the gatekeeper GK 2, including the Globally Unique Call Identifier used to identify the call when set up had been initiated with gatekeeper GK 1. In a step 608, the gatekeeper GK 2 relays the call set-up message to the endpoint Client 2's primary state machine 110c. In response, the endpoint Client 2's primary state machine 110c recognizes the received GUId as identifying the previously established call, which is maintained by the direct (non-gatekeeper routed) signaling, in a step 609. In a step 610, the endpoint Client 2's primary state machine 110c conducts an ARQ/ACF exchange with the gatekeeper GK 2. In a step 612, the endpoint Client 2's primary state machine 110a sends H.225.0 Alerting and Connect messages to the gatekeeper GK 2. The gatekeeper GK 2, in turn provides the Alerting and Connect messages to the endpoint Client 1's primary state machine 110a in a step 614. The Alerting or Connect message includes the Gatekeeper H.245 Control Channel Transport Address, which is used, in a step 616, to establish the H.245 control channel. Control of the media channel is then transferred by the arbitration layer 29 to the primary state machines 110a, 110c in a step 618. The arbitration layer 29 notifies the client application via the SCUI 20 that the primary signaling has been re-established and that the gatekeeper dependent features are once again available.

What is claimed is:

1. An H.323 client terminal, comprising:
   a first H.323 controller configured to handle call and control signaling during a media communication with another H.323 client terminal via a first gatekeeper;
   a second H.323 controller configured to handle call and control signaling directly with another client terminal;
   wherein said second H.323 controller provides redundant H.323 call and control signaling for said media connection while said media connection is ongoing and while said first H.323 controller provides call and control signaling for said media connection via said first gatekeeper, and said second H.323 controller provides call and control signaling for said media connection directly with another client terminal if said first gatekeeper fails.

2. An H.323 client terminal, in accordance with claim 1, wherein said first H.323 controller and said second H.323 controller are configured to provide a same globally unique call identifier (GUId) to said first gatekeeper and said second client terminal.

3. An H.323 client terminal, comprising:
   a first H.323 controller configured to handle call and control signaling during a media communication with another H.323 client terminal via a first gatekeeper;
   a second H.323 controller configured to handle call and control signaling directly with another client terminal;
   wherein said second H.323 controller provides redundant H.323 call and control signaling for said media connection while said first H.323 controller provides call and control signaling for said media connection via said first gatekeeper, and said second H.323 controller provides call and control signaling for said media connection directly with another client terminal if said first gatekeeper fails;
   wherein said first H.323 controller and said second H.323 controller are configured to provide a globally unique call identifier (GUId) to said second client terminal that is different but can be associated in a known way with a globally unique call identifier presented to said first gatekeeper.

4. A communication client terminal for use in a network having separate signaling and media channels, comprising:
   a first controller configured to handle call signaling during a media communication with another client terminal via a first gatekeeper;

a second controller configured to handle call signaling directly with another client terminal;

wherein said second controller provides redundant signaling for said media connection while said media connection is ongoing and while said first controller provides call signaling for said media connection via said first gatekeeper, and said second controller provides said call signaling for said media connection directly if said first gatekeeper fails.

5. A communications client terminal, in accordance with claim 4, wherein said first controller and said second controller are configured to provide a same unique call identifier to said first gatekeeper and said second client terminal.

6. A communication client terminal for use in a network having separate signaling and media channels, comprising:

a first controller configured to handle call signaling during a media communication with another client terminal via a first gatekeeper;

a second controller configured to handle call signaling directly with another client terminal;

wherein said second controller provides redundant signaling for said media connection while said first controller provides call signaling for said media connection via said first gatekeeper, and said second controller provides said call signaling for said media connection directly if said first gatekeeper fails;

wherein said first controller and said second controller are configured to provide a unique call identifier to said second client terminal that is different from, but can be associated in a known way, with a unique call identifier presented to said first gatekeeper.

7. A communications client terminal, in accordance with claim 4, wherein said communications client terminal comprises an H.323 client terminal.

8. A communications client terminal, in accordance with claim 4, wherein said communications client terminal operates in a network having separate media and signaling channels.

9. A telecommunications system, having separate media and signaling channels, comprising:

a packet-switched network;

a plurality of client terminals coupled to said packet switched network;

a plurality of gatekeepers coupled to said packet switched network;

wherein the plurality of client terminals are configured to establish primary signaling connections with one another via a first of said plurality of gatekeepers, and redundant signaling connections with one another directly while maintaining a single media connection such that if said primary gatekeeper fails, said media connection is maintained with said redundant signaling connection.

10. A telecommunications system, having separate media and signaling channels, comprising:

a packet-switched network;

a plurality of client terminals coupled to said packet switched network;

a plurality of gatekeepers coupled to said packet switched network;

wherein the plurality of client terminals are configured to establish primary signaling connections with one another via a first of said plurality of gatekeepers, and redundant signaling connections with one another directly while maintaining a single media connection such that if said primary gatekeeper fails, said media connection is maintained with said redundant signaling connection;

wherein said client terminals are configured to establish signaling via another of said plurality of gatekeepers while control signaling is being provided directly by said redundant signaling connection.

11. A telecommunications system, having separate media and signaling channels, comprising:

a packet-switched network;

a plurality of client terminals coupled to said packet switched network;

a plurality of gatekeepers coupled to said packet switched network;

wherein the plurality of client terminals are configured to establish primary signaling connections with one another via a first of said plurality of gatekeepers, and redundant signaling connections with one another directly while maintaining a single media connection such that if said primary gatekeeper fails, said media connection is maintained with said redundant signaling connection;

wherein a predetermined number, less than a total number, of said plurality of client terminals are equipped to establish said gatekeeper routed primary and direct, non-gatekeeper routed redundant signaling connections.

12. A telecommunications system according to claim 11, wherein at least one of said predetermined number of said plurality of client terminals are configured to search for a back-up gatekeeper if said first gatekeeper fails while a signaling channel is maintained by said redundant signaling connection.

13. A telecommunications system, according to claim 9, wherein said packet-switched network comprises an H.323 network and said client terminals comprise H.323 clients and said gatekeepers comprise H.323 gatekeepers.

14. A telecommunications system, according to claim 9, wherein said packet-switched network comprises a network having separate media and signaling channels.

15. A telecommunications method for a system having separate media and signaling channels, the method comprising:

providing a packet-switched network;

providing a plurality of client terminals coupled to said packet switched network;

providing a plurality of gatekeepers coupled to said packet switched network;

wherein the plurality of client terminals are configured to establish primary signaling connections with one another via a first of said plurality of gatekeepers, and redundant signaling connections with one another directly while maintaining a single media connection such that if said primary gatekeeper fails, said media connection is maintained with said redundant signaling connection.

16. A telecommunications method according to claim 15, wherein said client terminals are configured to establish signaling via another of said plurality of gatekeepers while control signaling is being provided directly by said redundant signaling connection.

17. A telecommunications method according to claim 15, wherein a predetermined number, less than a total number, of said plurality of client terminals are equipped to establish said gatekeeper routed primary and direct, non-gatekeeper routed redundant signaling connections.

18. A telecommunications method according to claim 17, wherein at least one of said predetermined number of said plurality of client terminals are configured to search for a back-up gatekeeper if said first gatekeeper fails while a signaling channel is maintained by said redundant signaling connection.

19. A telecommunications method, according to claim 15, wherein said packet-switched network comprises an H.323 network and said client terminals comprise H.323 clients and said gatekeepers comprise H.323 gatekeepers.

* * * * *